(12) United States Patent
Spencer et al.

(10) Patent No.: US 10,913,833 B2
(45) Date of Patent: Feb. 9, 2021

(54) PREPREGS AND PRODUCTION OF COMPOSITE MATERIAL USING PREPREGS

(71) Applicant: Gurit (UK) Ltd., Newport (GB)

(72) Inventors: Paul Spencer, Southampton (GB); Laura Jane Slade, Ryde (GB)

(73) Assignee: Gurit (UK) Ltd., Newport (GB)

( * ) Notice: Subject to any disclaimer, the term of this patent is extended or adjusted under 35 U.S.C. 154(b) by 264 days.

(21) Appl. No.: 15/756,721

(22) PCT Filed: Sep. 5, 2016

(86) PCT No.: PCT/EP2016/070879
§ 371 (c)(1),
(2) Date: Mar. 1, 2018

(87) PCT Pub. No.: WO2017/037294
PCT Pub. Date: Mar. 9, 2017

(65) Prior Publication Data
US 2018/0237603 A1 Aug. 23, 2018

(30) Foreign Application Priority Data
Sep. 4, 2015 (GB) .................................. 1515715.9

(51) Int. Cl.
*C08J 5/24* (2006.01)
*C08G 59/40* (2006.01)
(Continued)

(52) U.S. Cl.
CPC .................. *C08J 5/24* (2013.01); *B29C 70/34* (2013.01); *C08G 59/4021* (2013.01);
(Continued)

(58) Field of Classification Search
CPC ........................... B29C 35/007; B29C 35/0294
See application file for complete search history.

(56) References Cited

U.S. PATENT DOCUMENTS

| 4,452,847 A | 6/1984 | Siemon |
| 4,912,190 A * | 3/1990 | Schafer .............. C08G 59/4014 528/102 |

(Continued)

FOREIGN PATENT DOCUMENTS

| CN | 102575031 A | 7/2012 |
| CN | 104334602 A | 2/2015 |

(Continued)

OTHER PUBLICATIONS

InChemRez Phenoxy Resins: Product and Application Guide (2002).*
(Continued)

*Primary Examiner* — Peter L Vajda
*Assistant Examiner* — Paul Spiel
(74) *Attorney, Agent, or Firm* — Polsinelli, P.C.

(57) ABSTRACT

A prepreg having at least one layer of fibres and a curable thermosetting resin system at least partly impregnating the at least one layer of fibres, wherein the curable thermosetting resin system includes a curable thermosetting resin including at least two epoxide groups, a curing agent that includes at least one amine group, and an accelerator that includes an azole group; wherein the curable thermosetting resin, the curing agent and the accelerator are provided in respective concentrations in the prepreg to provide that, after curing the thermosetting resin at a cure temperature of at least 140° C. for a period of from 1 to 6 minutes, (i) the cured thermosetting resin has a glass transition temperature Tg which is greater than the cure temperature and is within the range of from 150° C. to 180° C. and (ii) the cured thermosetting resin is at least 90% cured.

24 Claims, 3 Drawing Sheets

(51) Int. Cl.
*C08G 59/68* (2006.01)
*C08G 59/50* (2006.01)
*B29C 70/34* (2006.01)
*C08G 59/60* (2006.01)
*B29K 63/00* (2006.01)
*B29K 105/08* (2006.01)
*B29K 307/04* (2006.01)

(52) U.S. Cl.
CPC ......... *C08G 59/50* (2013.01); *C08G 59/5073* (2013.01); *C08G 59/60* (2013.01); *C08G 59/686* (2013.01); *B29K 2063/00* (2013.01); *B29K 2105/0872* (2013.01); *B29K 2307/04* (2013.01); *C08J 2363/00* (2013.01); *C08J 2363/04* (2013.01); *C08J 2463/04* (2013.01)

(56) References Cited

U.S. PATENT DOCUMENTS

| | | | |
|---|---|---|---|
| 5,508,328 A | 4/1996 | Olson | |
| 2014/0159267 A1* | 6/2014 | Murch | B29C 35/007 264/40.6 |
| 2016/0230001 A1* | 8/2016 | Spencer | C08G 59/1488 |
| 2017/0291985 A1* | 10/2017 | Takaiwa | C08K 5/315 |
| 2018/0022862 A1* | 1/2018 | Sano | C08G 59/02 523/468 |
| 2018/0155489 A1* | 6/2018 | Ushiyama | C08G 59/226 |

FOREIGN PATENT DOCUMENTS

| | | |
|---|---|---|
| CN | 104558526 A | 4/2015 |
| EP | 0472830 A1 | 3/1992 |
| EP | 0879803 A1 | 11/1998 |
| EP | 3257884 A1 | 12/2017 |
| EP | 3309190 A1 | 4/2018 |
| GB | 2472423 A | 9/2011 |
| JP | 55071718 | 5/1980 |
| WO | 2014020060 A2 | 2/2014 |
| WO | 2016035459 A1 | 3/2016 |

OTHER PUBLICATIONS

International Preliminary Report on Patentability dated Mar. 6, 2018 in corresponding international application PCT/EP2016/070879.
Combined Search and Examination Report under Sections 17 and 18(3) dated Mar. 7, 2016 in corresponding application GB1515715.9.
Int'l. Search Report and Written Opinion dated Nov. 30, 2016 in corresponding application PCT/EP2016/070879.
Examination Report issued by European Patent Office for corresponding EP Application No. 16763010.2 dated Jun. 2, 2020.
Chinese Office Action dated Apr. 26, 2020 with English language translation.

* cited by examiner

PREPREGS AND PRODUCTION OF COMPOSITE MATERIAL USING PREPREGS

FIELD OF THE INVENTION

The present invention relates to prepregs comprising at least one layer of fibres and a curable thermosetting resin system, to a method of producing a fibre reinforced resin matrix composite material using such prepregs. The present invention particularly relates to prepregs, in particular comprising carbon fibres and a curable thermosetting resin system, which can be rapidly cured at elevated temperature in a moulding press.

BACKGROUND OF THE INVENTION

Glass and/or carbon fibre composite materials are commonly employed in high cost/high performance applications where light-weight structures are required. The high mechanical performance of some composite materials can provide many applications in high-value markets such as structural automotive components, in particular body panels and other structural parts. In order to provide a high output production process, and consequently low production costs, coupled with the required mechanical properties and aesthetic visual appearance of the composite material, the composite material needs to be produced by press moulding, using a moulding press at an elevated temperature.

Some prepregs are available in the market which are alleged to be useful in press moulding operations at elevated temperature. However, these known prepregs tend to suffer from a number of technical problems.

First, there is a need in the art to provide a hot-in/hot-out (HI-HO) press moulding process in which the preform composed of one or more prepregs to be moulded is inserted into a hot press which has not required a cooling step after the preceding moulding cycle and the press moulded composite material is removed from the hot press without requiring a cooling step after that moulding cycle. However, many known prepregs exhibit problems when used in a HI-HO press moulding process or cannot be used in such a process.

There is also a need in the art for prepregs which cure rapidly, so called "snap-curing" prepregs, which substantially fully cure, which means that the thermosetting resin system is at least 90% cured, within a short time period, such as within a period of less than 6 minutes, and can be press moulded at elevated temperature in a HI-HO press moulding process.

For example, some known prepregs which are alleged to cure rapidly nevertheless cannot fully cure in the press mould, and so require a post-curing operation. This increases processing time and production cost. Other known prepregs cannot be inserted into a hot press mould, because they cure prematurely, and so the press mould needs to be cooled prior to prepreg insertion, which increases the press moulding cycle time. Such premature curing prepregs may also exhibit a very short shelf life, which is undesirable. Other known prepregs cannot generate sufficient mechanical properties as a result of press moulding, and so cannot be used for structural components. Other known prepregs cannot be removed from a hot press mould, because they are insufficiently cured and so physically distort when handled at elevated temperature, and so the press mould needs to be cooled prior to removal of the composite material moulded product, which increases the press moulding cycle time.

There is therefore currently a need in the art for a prepreg which includes a thermosetting resin system which not only provides high mechanical properties when cured, but also can be rapidly cured in a HI-HO press moulding process. Such a prepreg can be produced using low cycle times in a press mould thereby achieving cost-effective manufacture, in a high volume production process, of structural components composed of thermoset composite material.

The present invention at least partially aims to meet this need.

SUMMARY OF THE INVENTION

The present invention accordingly provides a prepreg comprising at least one layer of fibres and a curable thermosetting resin system, the curable thermosetting resin system at least partly impregnating the at least one layer of fibres, wherein the curable thermosetting resin system comprises:
  a. a curable thermosetting resin including at least two epoxide groups;
  b. a curing agent for curing the curable thermosetting resin, wherein the curing agent includes at least one amine group; and
  c. an accelerator for accelerating the curing of the thermosetting resin by the curing agent, wherein the accelerator includes an azole group;
wherein the curable thermosetting resin, the curing agent and the accelerator are provided in respective concentrations in the prepreg to provide that, after curing the thermosetting resin at a cure temperature of at least 140° C. for a period of from 1 to 6 minutes, (i) the cured thermosetting resin has a glass transition temperature Tg which is greater than the cure temperature and is within the range of from 150° C. to 180° C. and (ii) the cured thermosetting resin is at least 90% cured.

The present invention further provides a method of producing a fibre reinforced resin matrix composite material, the method comprising the steps of:
  (i) providing a laminated stack of prepregs, each prepreg comprising prepreg comprising at least one layer of fibres and a curable thermosetting resin system, the curable thermosetting resin system at least partly impregnating the at least one layer of fibres, wherein the curable thermosetting resin system comprises:
    a. a curable thermosetting resin including at least two epoxide groups;
    b. a curing agent for curing the curable thermosetting resin, wherein the curing agent includes at least one amine group; and
    c. an accelerator for accelerating the curing of the thermosetting resin by the curing agent, wherein the accelerator includes an azole group; and
  (ii) heating up the laminated stack of prepregs in a mould to cause the curable thermosetting resin system to flow and fully impregnate the fibres and to cure to form a cured thermoset resin matrix in a moulded component; wherein the curable thermosetting resin, the curing agent and the accelerator are provided in respective concentrations in the prepreg to provide that, after curing the thermosetting resin at a cure temperature of at least 140° C. for a period of from 1 to 6 minutes, (i) the cured thermosetting resin has a glass transition temperature Tg which is greater than the cure temperature and is within the range of from 150° C. to 180° C. and (ii) the cured thermosetting resin is at least 90% cured.

The prepregs of the preferred embodiments of the present invention provide a number of technical advantages over known prepregs.

The preferred embodiments of the present invention can provide a rapid curing (1-6 minutes to at least 90% cure depending on the curing temperature) prepreg. This prepreg can generate a Tg (which in this specification means the glass transition temperature, Tgl, of the cured thermosetting resin system) greater than the curing temperature, thereby allowing components to be pressed in a pre-heated press and immediately demoulded after curing without the need to allow the press to reduce in temperature, which would otherwise be required to eliminate distortion of the component. This offers the key advantage that cycle times in the curing press can be significantly reduced, allowing cost-effective manufacture of high volume thermoset composite components.

The preferred embodiments of the present invention can provide a thermosetting resin system which is formulated to ensure that the mechanical properties of the cured resin in the moulded component are high enough that the prepreg can be used for the manufacture of structural components such as those for the automotive industry. This invention allows the utilisation of thermoset prepregs in high volume production and/or applications requiring very short cycle times and consequent tool utilisation. This allows thermoset composites to be used in applications previously only suitable for mouldable materials such as metals, thermoplastics and moulding compounds, such as sheet moulding compounds (SMC), bulk moulding compounds (BMC), etc.

The present invention can therefore provide a prepreg which permits rapid manufacture of structural automotive components, for example automotive body panels and cosmetic or structural fairings. The prepreg can also be used for high volume pressing applications, for example to provide consumer electronic component casings (e.g. for handheld electronic devices) or sports goods, and in other applications as a replacement for metal or thermoplastic material.

The preferred embodiments of the present invention can provide a rapid curing time, typically 1-5 minutes depending on the curing temperature. The resin can be formulated to provide an optimised rheology to allow rigidity for insertion of a preform into a pre-heated press. The resin can be formulated to provide some latency to allow flow of resin during the pressing cycle without premature curing, which would otherwise result in low quality components.

True hot-in hot-out curing can be provided by the prepreg, thereby eliminating the need for further post cure of the resin and/or cooling of the press prior to demoulding. The prepreg can have a long material shelf life, for example greater than >4 weeks at ambient temperature (20° C.). The resultant cured composite material component can exhibit high thermal and mechanical properties.

The present invention has particular application to the formulation of carbon fibre prepregs where the final cured laminate has structural properties, for example for use as a component in high-value consumer applications such as automobiles, yachts, and consumer electronics, optionally where the press moulded component is desired to have a high quality surface finish.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
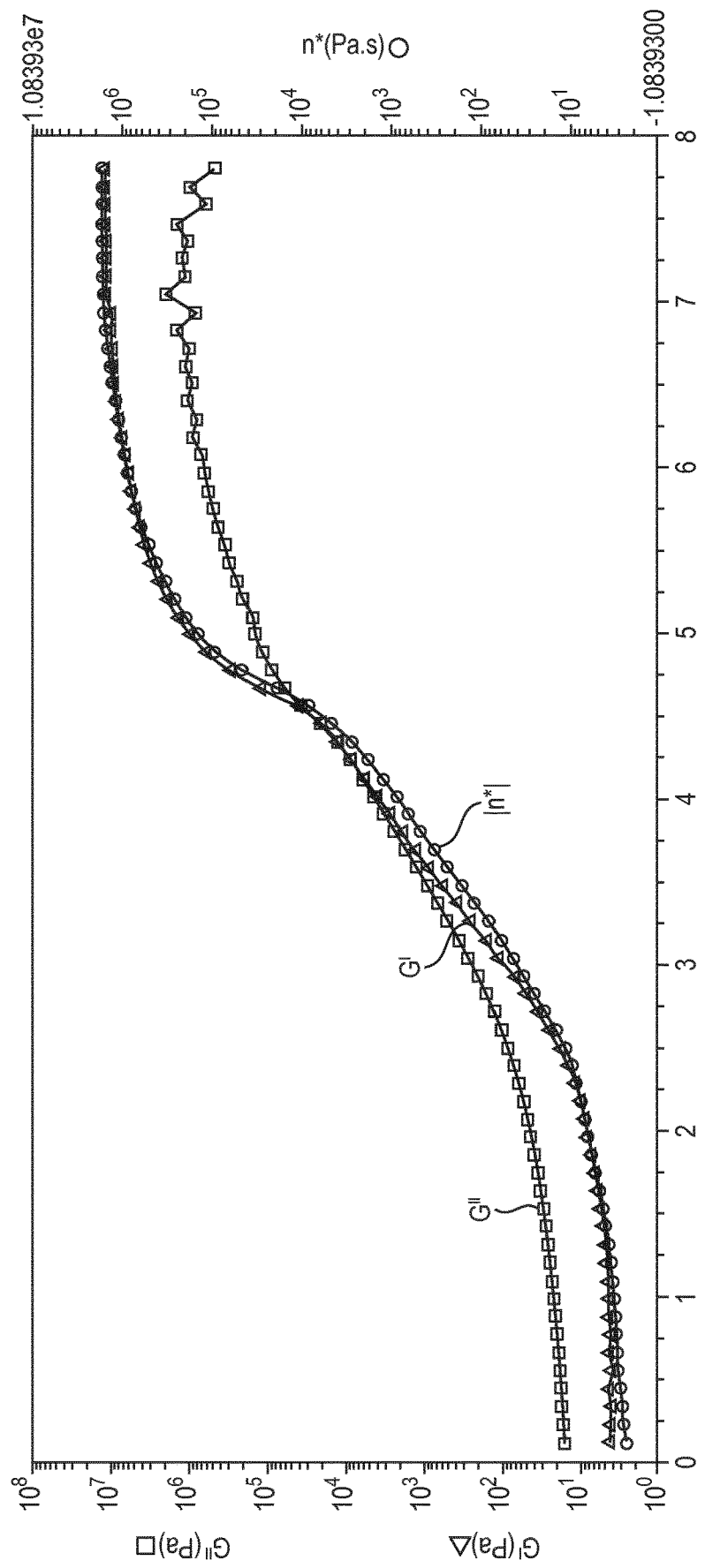
FIG. 1 is a graph showing the relationship between storage modulus, loss modulus and complex viscosity with respect to time, for a thermosetting resin system according to an Example of the present invention.

In accordance with preferred embodiments of the present invention, there is provided a prepreg. The prepreg comprises at least one layer of fibres and a curable thermosetting resin system.

The fibres are typically composed of carbon or glass. A mixture of carbon and glass fibres may be used. Carbon fibres are particularly preferred for the manufacture of structural components such as automotive components, for example body panels. The fibres may be present in any form known to those skilled in the art, and typically are present in the form of a woven fabric or a unidirectional fibre web supported only by the resin matrix in the prepreg to form what is known in the art as a "UD prepreg". Various weave patterns and fabric weights may be employed, in accordance with the common general knowledge of the skilled person. The carbon fibres may have a uniaxial, biaxial or multiaxial fibre orientation, as is well known to those skilled in the art.

The curable thermosetting resin system at least partly impregnates the at least one layer of fibres. Typically, the curable thermosetting resin system fully impregnates at least one layer of fibres. Alternatively, a "semi-preg" prepreg structure may be provided, in which a layer of the resin is adjacent to a layer of fibres. In either prepreg construction, during the curing step the resin is heated and is consequently lowered in viscosity so as to flow and fully to wet out the fibres and form a coherent resin matrix surrounding the fibres, and also a coherent resin matrix interface between adjacent fibre layers, prior to curing of the resin.

The curable thermosetting resin system of the preferred embodiments comprises three components:

a. a curable thermosetting resin including at least two epoxide groups;

b. a curing agent for curing the curable thermosetting resin, wherein the curing agent includes at least one amine group; and c. an accelerator for accelerating the curing of the thermosetting resin by the curing agent, wherein the accelerator includes an azole group.

The curable thermosetting epoxy resin is multifunctional to provide a high Tg matrix with sufficient flow control to allow easy insertion of the prepreg into a heated press mould and avoid or minimise excessive resin bleed out from the prepreg during the initial cure phase.

The curing agent can provide a rapid cure at elevated temperatures to achieve fast or "snap" curing. The curing agent may have high functionality to enable a high Tg to be attained, facilitating the achievement of a HI-HO process. The accelerator can reduce the onset of reaction, thereby allowing rapid curing at high temperatures, the accelerator providing a latent period, with minimal curing, at the start of the press moulding operation to allow sufficient resin flow and shape development of the preform during closure of the press mould. The accelerator can also provide a desired shelf life of the prepreg, for example a shelf life of greater than 4 weeks at an ambient temperature of 20° C., to enable the prepreg to be stored between prepreg manufacture and prepreg moulding without excessive undesirable resin advancement (precuring or staging).

The curable thermosetting epoxy resin typically comprises a blend of epoxide functional resins with an epoxide functionality of greater than or equal to 2. High functional/multifunctional resins are preferably used in the blend in order to achieve a cured resin matrix with a high cross link density and resulting thermal resistance. Optionally, the resin matrix may be combined with an elastomer, liquid rubber, or thermoplastic to provide an increase in toughness, and to act as a rheology modifier to reduce the amount of resin flow during cure, in order to produce a high quality laminate and/or increase the surface "tack" of the uncured prepreg ply to improve material handling during processing. The final resin viscosity is optimised in order to provide suitable rheology to be compatible with a high temperature press curing process, in which process the prepreg plies are cut, the plies are assembled to form a preform in the form of a laminate which is optionally pre-moulded, and the preform is transferred to a heated press mould to cause resin flow during press curing.

Typically, the curable thermosetting resin is selected from at least one of an epoxy novolac resin, an epoxy cresol novolac resin and an epoxy phenol novolac resin, or a mixture of any two or more thereof. The curable thermosetting resin may be present in an amount of from 60 to 95 wt %, optionally from 85 to 95 wt %, based on the weight of the curable thermosetting resin system.

In a particularly preferred embodiment, the curable thermosetting resin has a viscosity of from 4 to 8 Pa·s, optionally from 5 to 6 Pa·s, at a temperature of 100° C. This may be the minimum resin viscosity when the resin is heated from ambient temperature (20° C.) up to the curing temperature (greater than 150° C.). The viscosity is measured using a commercially available viscometer, namely a Brookfield CAP2000 Viscometer using cone 3 at a rotational velocity of 50 rpm, which corresponds to a shear rate of 665 $s^{-1}$. Optionally, lower or higher resin viscosities may be employed and may be a function of different resin curing temperatures.

The epoxy resin, and the associated curing agent and accelerator, are formulated so that the epoxy resin is to be cured at various curing temperatures, the curing temperature being at least 140° C. A typical curing temperature is within the range of from 150 to 170° C. The curing time may vary with the curing temperature, for example to provide a curing time of 1 minute at a curing temperature of 170° C. or a curing time of 5 minutes at a curing temperature of 150° C., and with curing times correspondingly between 5 and 1 minutes with curing temperatures between 150 and 170° C.

The cured epoxy resin is formulated to have a desired glass transition temperature, Tg, as known to those skilled in the art. The cured epoxy resin has a Tg of from 150 to 180° C., optionally from 160 to 180° C.

When combined with the accelerator, the curing agent is reactive enough to cure within a desired cure schedule, defined by time and temperature. The curing agent also has latency to provide storage stability for the prepreg material and to prevent premature curing of the epoxy resin upon insertion of the prepreg into a heated mould tool.

For achieving the desired properties of the cured thermoset resin, the curing agent should be used in a suitable ratio together with the curable thermoset resin, e.g. epoxy resin, as discussed above. The active hydrogen equivalent weight of the curing agent and the epoxy equivalent weight of the selected resin are used to determine the ideal mix ratio, as known to those skilled in the art. The accelerator is also required in order to ensure that the material cures within the desired schedule and also in order to control the resin flow properties prior to resin gelation during prepreg resin curing to form the composite material during manufacture.

In a particularly preferred embodiment, the curing agent comprises dicyandiamide. The dicyandiamide is present in the form of particles, preferably having a particle size of from 1 to 20 microns, more preferably from 1 to 4 microns, further preferably from 1 to 3 microns, yet further preferably about 2 microns. Typically, the curing agent is present in an amount of from 2 to 18 wt %, optionally from 4 to 6 wt %, based on the weight of the curable thermosetting resin system.

In a particularly preferred embodiment, the accelerator comprises at least one imidazole. Typically, the accelerator is present in an amount of from 0.2 to 3 wt %, optionally from 0.4 to 1.6 wt %, based on the weight of the curable thermosetting resin system.

The curable thermosetting resin, the curing agent and the accelerator are preferably provided in respective concentrations in the prepreg to provide that, after curing the thermosetting resin at a cure temperature of at least 150° C. for a period of from 1 to 6 minutes, (i) the cured thermosetting resin has a Tg which is greater than the cure temperature and is within the range of from 160° C. to 180° C. and (ii) the cured thermosetting resin is at least 90% cured.

In a particularly preferred embodiment, the curable thermosetting resin, the curing agent and the accelerator are provided in respective concentrations in the prepreg to provide that, after curing the thermosetting resin at a cure temperature of at least 150° C. for a period of from 1 to 5 minutes, (i) the cured thermosetting resin has a Tg which is greater than the cure temperature and is within the range of from 170° C. to 180° C. and (ii) the cured thermosetting resin is at least 90% cured and more preferably to provide that, after curing the thermosetting resin at a cure temperature of at least 150° C. for a period of from 1 to 5 minutes, (i) the cured thermosetting resin has a Tg which is greater than the cure temperature and is within the range of from 170° C. to 180° C. and (ii) the cured thermosetting resin is at least 95% cured, optionally at least 98% cured.

Preferably, the curable thermosetting resin, the curing agent and the accelerator are provided in respective concentrations in the prepreg to provide that, after heating the curable thermosetting resin system to the cure temperature of at least 140° C., optionally at least 150° C., the thermosetting resin is no more than 30% cured after a period of from 0.5 to 1 minute.

In a particularly preferred embodiment, the curable thermosetting resin system further comprises component d, which is a second accelerator which comprises a substituted or unsubstituted urea of formula $R_1R_2$—N—CO—$NR_3R_4$, where $R_1$ is hydrogen or any substituted or unsubstituted aliphatic group, $R_2$ is hydrogen or any substituted or unsubstituted aliphatic, $R_3$ is hydrogen or any substituted or unsubstituted aliphatic or aromatic group, and $R_4$ is hydrogen or any substituted or unsubstituted aliphatic or aromatic group. Typically, in the urea of formula $R_1R_2$—N—CO—

$NR_3R_4$, $R_1$ and $R_2$ are methyl groups, $R_3$ is hydrogen, and $R_4$ is a substituted or unsubstituted aromatic group. $R_4$ is a halogen-substituted aromatic group, for example a fluorine-substituted aromatic group. Preferably, the second accelerator comprises a substituted urone, optionally selected from monuron, fenuron, diuron or fluometuron, or a mixture of any two or more of any thereof. Typically, the second accelerator is present in an amount of from 0.5 to 5 wt %, optionally from 1.2 to 2.5 wt %, based on the weight of the curable thermosetting resin system.

In a particularly preferred embodiment, the curable thermosetting resin system further comprises component e, which is at least one rheology modifier for the curable thermosetting resin system, wherein the rheology modifier comprises at least one thermoplastic resin, elastomer or liquid rubber or any combination of two or more thereof. The rheology modifier can also function as a toughening component of the cured thermoset resin matrix.

Preferably, the rheology modifier includes at least one of a phenoxy resin, an acrylic resin, a polyacrylate resin, a polyacrylonitrile resin, a polyetherimide resin, a polyketone resin and a polysulphone resin, or a mixture of any two or more thereof.

Most typically, the thermoplastic resin is a phenoxy resin, such as a phenoxy resin available in powder form under the trade name InChemRez PKHP-200 available in commerce from InChem Corporation.

Typically, the thermoplastic resin, elastomer or liquid rubber of the rheology modifier has a softening point within the range of from 170 to 190° C., more preferably from 175 to 185° C., further optionally about 180° C.

The curable thermosetting resin is typically blended with the rheology modifier, although in some embodiments no such rheology modifier is present in the curable thermosetting resin system. The rheology modifier provides the required drape, handling properties and mechanical properties, such as toughening, for the particular application of the prepreg to be moulded. In some embodiments, the drape properties may be provided by the curable thermosetting resin, thereby obviating the need for a rheology modifier. As stated above, the rheology modifier is typically at least one thermoplastic resin, elastomer or liquid rubber although the rheology modifier may alternatively or additionally comprise an inorganic particulate thickener, such as fumed silica. Other inorganic particulate thickeners are known in the art and may be employed in the invention.

The weight ratio of the curable thermosetting resin and the thermoplastic resin elastomer or liquid rubber of the rheology modifier is controlled so as to provide the desired drape, handling and mechanical properties to the prepreg. In each embodiment, the composition and amount of the rheology modifier(s) may readily be selected based on the desired drape properties of the prepreg during layup of the prepreg into a mould, and also selected based on the desired flow properties of the curable thermosetting resin system during the curing step at elevated temperature.

Typically, the at least one rheology modifier is present in an amount of from 2 to 20 wt %, optionally from 5 to 10 wt %, based on the weight of the curable thermosetting resin system.

Preferably, the curable thermosetting resin, the curing agent and the accelerator are provided in respective concentrations in the prepreg to provide that, during curing the thermosetting resin at a cure temperature of at least 140° C., optionally at least 150° C., the storage modulus G' and the loss modulus G" exhibit a cross-over point within a period of from 2.5 to 5.5 minutes, optionally from 2.5 to 4.5 minutes after the curable thermosetting resin system has attained the cure temperature.

Preferably, the curable thermosetting resin, the curing agent and the accelerator are provided in respective concentrations in the prepreg to provide that, during curing the thermosetting resin at a cure temperature of at least 140° C., optionally at least 150° C., the storage modulus G' is a value of less than 100 Pa within a period of from 2 to 3 minutes after the curable thermosetting resin system has attained the cure temperature.

Preferably, the curable thermosetting resin, the curing agent and the accelerator are provided in respective concentrations in the prepreg to provide that, during curing the thermosetting resin at a cure temperature of at least 140° C., optionally at least 150° C., the loss modulus G" is a value of $10^5$ Pa within a period of from 4.5 to 6 minutes, optionally from 5.5 to 6 minutes, after the curable thermosetting resin system has attained the cure temperature.

By using the accelerator for the resin curing, resin flow during the temperature ramp stage of the cure cycle prior to gelation can be readily controlled. Furthermore, the curing can be controlled over a range of cure schedules. In addition, the properties of the final cured epoxy resin in the composite material can be controlled.

For the urea accelerator within the preferred formulation, it is desirable that it is latent at ambient temperatures, thus allowing good shelf-life of the mixed, uncured product under ambient conditions. The urea accelerator, in combination with the respective curing agent, is therefore selected based on the cure schedule, and the desired final properties of the composite material.

When formulating the curable thermosetting resin system, the base epoxide-containing resin, and the optional thermoplastic resin rheology modifier, are blended to form the overall resin constituent of the formulation and the curing agent and accelerator are mixed together to form the catalyst paste. The catalyst paste can be either with or without a carrier. Typically, no carrier is required. The overall resin constituent and the catalyst paste are mixed together in the desired ratio prior to impregnation of the fibres during manufacture of the prepreg.

The moulding process is typically conducted in a moulding press at an elevated positive pressure and at the elevated cure temperature. However the moulding process may be carried out under negative pressure in a vacuum or under positive pressure in an autoclave.

The present invention further provides a method of producing fibre reinforced resin matrix composite material from the prepregs of the invention as described above.

In the method, a laminated stack of prepregs is provided. The stack is typically laid up outside a heated press mould to form a preform. The preform is shaped, configured and dimensioned so that the resultant composite material component has the desired shape, configuration and dimensions. Then the preform comprising the laminated stack of prepregs is inserted into the press mould. The resin rheology curable thermosetting resin system is preferably formulated so that the preform is substantially rigid and so can readily be inserted directly into the mould tool.

In the press mould, the laminated stack of prepregs is heated up to cause the curable thermosetting resin system to flow and fully impregnate the fibres and to cure to form a cured thermoset resin matrix. The entire moulding process to achieve substantially full cure preferably takes less than 6 minutes.

As the temperature is initially increased, the viscosity of the resin decreases. The reduced resin viscosity permits the resin to flow and fully wet out and impregnate the prepreg fibres.

A viscosity minimum may be achieved at about 100° C. The viscosity is typically from 4 to 8 Pa·s, optionally from 5 to 6 Pa·s, at a temperature of 100° C.

In other preferred examples, the viscosity minimum may be achieved at 95 to 105° C.

After the viscosity minimum is achieved, the viscosity rapidly increases, which indicates that the resin is rapidly curing. The minimum viscosity of the mixed resin/catalyst paste system was sufficiently high to allow the resin to flow less during the early stages of the cure, which would result in less resin being lost from the prepreg as a result of resin bleed out. This, in turn, improves both the quality of the cured product and reduces the wasted resin.

The press mould is heated by a heating apparatus to maintain the moulding surfaces at an elevated temperature which is at least the cure temperature of the thermosetting resin system of the prepregs. The preform is inserted into the heated press mould without permitting the moulding surfaces to cool substantially from the previous moulding cycle, and additionally the preform may be optionally preheated prior to insertion. This provides a hot-in (HI) press moulding method. If the preform is not preheated, typically the preform is at ambient temperature (typically 20° C.) prior to insertion.

In the press mould, during the heating step the laminated stack of prepregs is heated up rapidly to a curing temperature of at least 140° C., optionally from 150 to 170° C., and held at the curing temperature.

After substantially full cure of the thermosetting resin has been achieved, the moulded composite material component is removed from the press mould. The moulded composite material component is substantially rigid because the thermosetting resin is substantially fully cured and has a Tg greater than the temperature of the press mould, which corresponds to the curing temperature, and so can readily be removed directly from the mould tool without distortion of the moulded component. The moulded component does not need to be supported during removal, since it is rigid and self-supporting. The moulded composite material component is removed from the heated press mould without permitting the moulding surfaces, or the moulded component, to cool substantially from the temperature during the moulding cycle. This provides a hot-out (HO) press moulding method.

The cycle time of the moulding operation can accordingly be minimised by providing a HI-HO "snap-curing" prepreg.

Accordingly, in preferred embodiments of the present invention, the heating step is carried out in a press mould during a press moulding step. The moulding surfaces of the press mould are heated to the cure temperature. Prior to the heating step, the laminated stack of prepregs is inserted into the press mould between the moulding surfaces in a loading step. During the loading step the moulding surfaces are preferably at temperature which is the same as, or no more than 10° C. lower than, the cure temperature, and typically no more than 5° C., most preferably no more than 2° C. lower than, the cure temperature.

During the loading step the laminated stack of prepregs is at a temperature within a range of from 20 to 35° C., optionally at ambient temperature (20° C.). During the loading step the laminated stack of prepregs is in the form of a substantially rigid and self-supporting preform.

After the heating step in which the moulded component is formed, the moulded component is removed from the press mould in an unloading step. During the unloading step the moulding surfaces are preferably at temperature which is the same as, or no more than 10° C. lower than, the cure temperature, and typically no more than 5° C. lower than, most preferably no more than 2° C. lower than, the cure temperature.

During the unloading step the moulded component is substantially rigid and self-supporting.

Preferably, a time period between the loading and unloading steps is from 1 to 6 minutes, optionally from 2 to 5 minutes.

In the preferred embodiments, a sequence of a plurality of successive moulding cycles is carried out by the press mould, each cycle comprising a respective loading step, heating step in which a respective moulded component is formed from a respective laminated stack of prepregs, and unloading step, and the moulding surfaces are continuously maintained at a temperature which is within 10° C., optionally within 5° C., further optionally within 2° C., of a preset temperature corresponding to a predetermined cure temperature of the curable thermosetting resin system. Typically, a time period between the unloading and loading steps of successive moulding cycles is less than 2 minutes, optionally from 15 seconds to 1 minute.

After curing the thermosetting resin at a cure temperature of at least 140° C. for a period of from 1 to 6 minutes, (i) the cured thermosetting resin has a Tg which is greater than the cure temperature and is within the range of from 150° C. to 180° C. and (ii) the cured thermosetting resin is at least 90% cured.

In a particularly preferred embodiment, after curing the thermosetting resin at a cure temperature of at least 150° C. for a period of from 1 to 5 minutes, (i) the cured thermosetting resin has a Tg which is greater than the cure temperature and is within the range of from 170° C. to 180° C. and (ii) the cured thermosetting resin is at least 90% cured, and more preferably after curing the thermosetting resin at a cure temperature of at least 150° C. for a period of from 1 to 5 minutes, (i) the cured thermosetting resin has a Tg which is greater than the cure temperature and is within the range of from 170° C. to 180° C. and (ii) the cured thermosetting resin is at least 95% cured.

Preferably, after heating the curable thermosetting resin system to the cure temperature of at least 140° C., optionally at least 150° C., the thermosetting resin is no more than 30% cured after a period of from 0.5 to 1 minute. This provides a period of latency in which curing is minimised and allows the preform to be inserted into the heated press mould without premature curing. Such premature curing may otherwise prevent complete impregnation of the fibres by the resin, or may distort the moulded component.

Preferably, during curing the thermosetting resin at a cure temperature of at least 140° C., optionally at least 150° C., the storage modulus G' is a value of less than 100 Pa within a period of from 2 to 3 minutes after the curable thermosetting resin system has attained the cure temperature. Again, this provides a period of latency.

Preferably, during curing the thermosetting resin at a cure temperature of at least 140° C., optionally at least 150° C., the storage modulus G' and the loss modulus G" exhibit a cross-over point within a period of from 2.5 to 5.5 minutes, optionally from 2.5 to 4.5 minutes after the curable thermosetting resin system has attained the cure temperature. The storage modulus G' represents the elastic properties of a viscoelastic material and the loss modulus G" represents the viscous properties of a viscoelastic material. The cross-over point represents the gel point, in which the viscoelastic thermosetting resin becomes predominantly elastic (the rheological property of the resultant fully cured resin) rather than predominantly viscous (the rheological property of the initial uncured resin). In other words, the curing step rapidly cures the thermosetting resin to achieve the property of a cured resin.

Preferably, during curing the thermosetting resin at a cure temperature of at least 140° C., optionally at least 150° C., the loss modulus G" is a value of $10^5$ Pa within a period of from 4.5 to 6 minutes, optionally from 5.5 to 6 minutes, after the curable thermosetting resin system has attained the cure temperature. This provides a substantially elastic rigid cured resin within a short curing period of from 4.5 to 6 minutes or 5.5 to 6 minutes.

In alternative embodiments, the prepreg may be moulded by vacuum moulding, in which the prepreg stack is maintained in a vacuum throughout the curing cycle. The vacuum removes interlaminar and intralaminar air so as to reduce the void volume of the resultant moulded composite material product. Alternatively, an autoclave moulding process may be employed.

The present invention will now be illustrated in greater detail with reference to the following non-limiting Examples.

Example 1

An epoxy resin blend comprising a multifunctional epoxy resin and formulated to exhibit a Tg within the range of from 170 to 180° C. was provided. The epoxy resin blend was further blended with from 5 to 10 wt % of a phenoxy thermoplastic resin (trade name InChemRez PKHP-200 available in commerce from InChem Corporation). A catalyst paste was prepared which comprised from 4 to 6 wt % of dicyandiamide curing agent having a particle size of 2 microns, from 0.4 to 1.6 wt % of an imidazole accelerator (trade name Curezol 2MZ-Azine-S available in commerce from Air Products Inc.) and from 1.2 to 2.5 wt % of a substituted urone accelerator (fluometuron). The composition also included from 0.1 to 0.3 wt % of a surfactant W980 (available in commerce from Byk Chimie). In this paragraph all wt % values are by weight of the final curable thermosetting epoxy resin system.

The curable resin was subjected to a curing schedule in a test press mould cell, which simulated a curing schedule to be used for making moulded composite material components using prepregs incorporating the resin.

The test cell was at a temperature of 160° C. and the resin, at ambient temperature 20° C., was introduced into the test cell to simulate loading of a prepreg at ambient temperature into a press mould already heated, as a result of a previous moulding/curing cycle, to a curing temperature of 160° C.

The storage modulus G' (Pa), the loss modulus (G" (Pa) and the complex viscosity (η*(Pa·s) were measured with respect to time (minutes) and the results are shown in FIG. 1. These rheology parameters were measured using a TA Instrument AR2000ex rheometer with a 25 mm disposable aluminium flat spindle and a Peltier plate. Samples were introduced directly on the Peltier plate at the isothermal temperature and with a gap setting of 1000 μm. Viscoelastic data was collected at a frequency of 1 Hz and strain of 1%.

FIG. 1 shows the relationship between storage modulus (left-hand y-axis), complex viscosity (right-hand y-axis), loss modulus (left-hand y-axis), and time (x-axis) during the curing schedule.

It may be seen from FIG. 1 that the high functionality epoxy resin and the three different compounds of the catalyst system controlled the reaction kinetics to provide rapid curing.

The curable epoxy resin system can exhibit long-shelf life characteristics and a high Tg when cured.

FIG. 1 shows rheology curves of the system during curing to demonstrate the reaction characteristics indicated by an increase in resin system viscosity.

It may be seen that the resin system has a period of stable low complex viscosity and storage and loss moduli, representing a latent period, when the resin system is initially heated. For an initial period of about 3 minutes the complex viscosity and storage and loss moduli do not significantly increase, and after a total time of less than about 3 minutes the storage modulus G' is less than 100 Pa.

The latent period allows the resin system to be inserted into the press cell and the press cell closed in order to produce a cured component with sufficient consolidation and geometry.

Without this period of latency, the resin system would react prematurely and produce a poor quality component. It should be noted that the desired reaction lag would be related to the individual characteristics of the press being used, since presses with a faster closure rate would generally require a shorter latency period.

It may be seen that after the latency period the complex viscosity rapidly increases as a result of a rapid rate of curing of the epoxy resin by the catalyst system.

After a total time period of about 4.5 minutes the values of the storage and loss moduli are equal, and a cross-over point is established. This represents a gel point, at which the initial resin has become a viscoelastic gel. After the cross-over point the value of the loss modulus becomes higher than the value of the storage modulus. At the cross-over point the storage modulus and the loss modulus are each about 15500 Pa.

After a total time period of about 6.5 minutes the value of the loss modulus is about $1 \times 10^6$ Pa, and the complex viscosity levels off to a substantially constant maximum value. The resin is substantially fully cured, meaning at least 90% cured.

In this Example, dicyandiamide was used as the main compound to facilitate curing. Dicyandiamide has a high amine-functionality resulting in highly cross-linked epoxy resin networks, and consequently a high Tg, in this Example the Tg being in the range of from 170 to 180° C., in the cured resin. The kinetic characteristics of this reaction mean that the reaction only occurs at relatively high temperatures of 150° C. and above, and therefore, in order to achieve rapid curing at temperatures between 150 and 170° C., an accelerator/additional curing compound was employed. The accelerator to increase the reaction rate comprised an imidazole accelerator. The imidazole accelerator was used in combination with dicyandiamide in order to achieve sufficient thermal properties. Using only an imidazole accelerator with dicyandiamide can result in a bimodal kinetic distribution where two discrete reactions occur resulting in a heterogeneous network formation. In order to overcome this, a latent urone was added as a second accelerator to create a unimodal cure profile (when analysed using Differential Scanning Calorimetry (DSC)).

Other curing compounds could be used in place of the dicyandiamide to achieve the same high Tg functionality, as would be apparent to those skilled in the art. Other accelerator compounds could be used in place of the imidazole accelerator and the urone accelerator to achieve the same kinetic functionality, as would be apparent to those skilled in the art.

Examples 2, 3 and 4

Figure 2:
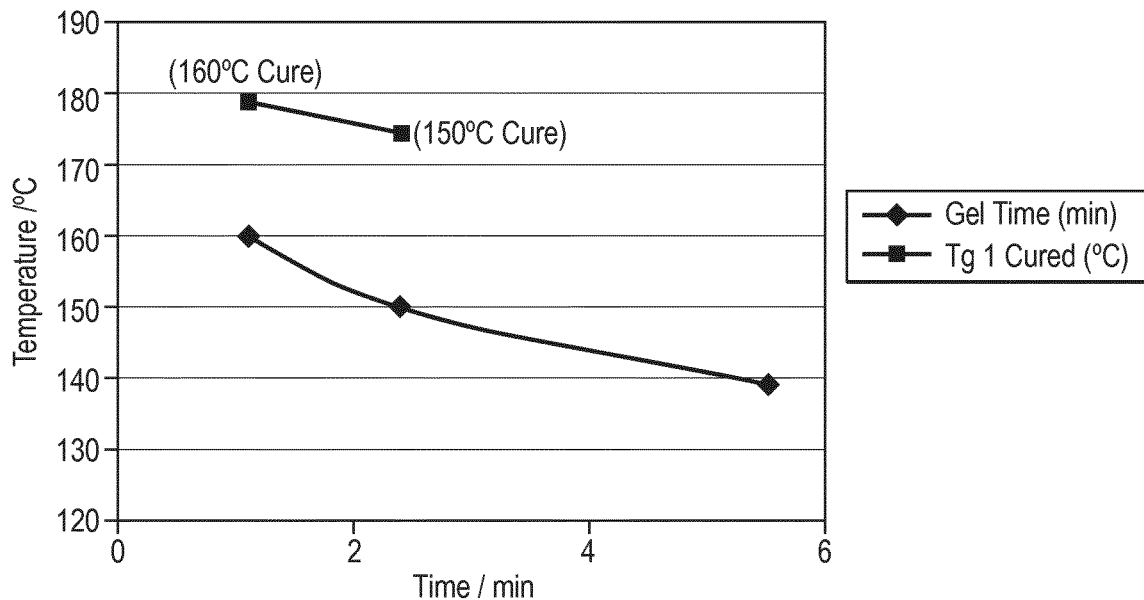
FIG. 2 is a graph showing the relationship between cure temperature and gel time, and the relationship between Tg and cure temperature, for a number of thermosetting resin systems according to Examples of the present invention.

Example 1 was repeated using three different cure temperatures, namely 140° C. (Example 2), 150° C. (Example 3) and 160° C. (Example 4). FIG. 2 shows the relationship between temperature in ° C. (y-axis) and gel time in minutes (x-axis). It may be seen that the gel time generally increases with reduced cure temperature.

FIG. 2 also shows the value of Tg varying with cure temperature. When the cure temperature was 160° C., the resin cured to provide a Tg of nearly 180° C. When the cure temperature was 150° C., the resin cured to provide a Tg of about 175° C. No Tg value was determined when the cure temperature was 140° C. The high Tg values were achieved at curing temperatures of at least 150° C. in time period of less than 2.5 minutes without requiring any post-curing or cooling of the mould.

Figure 3:
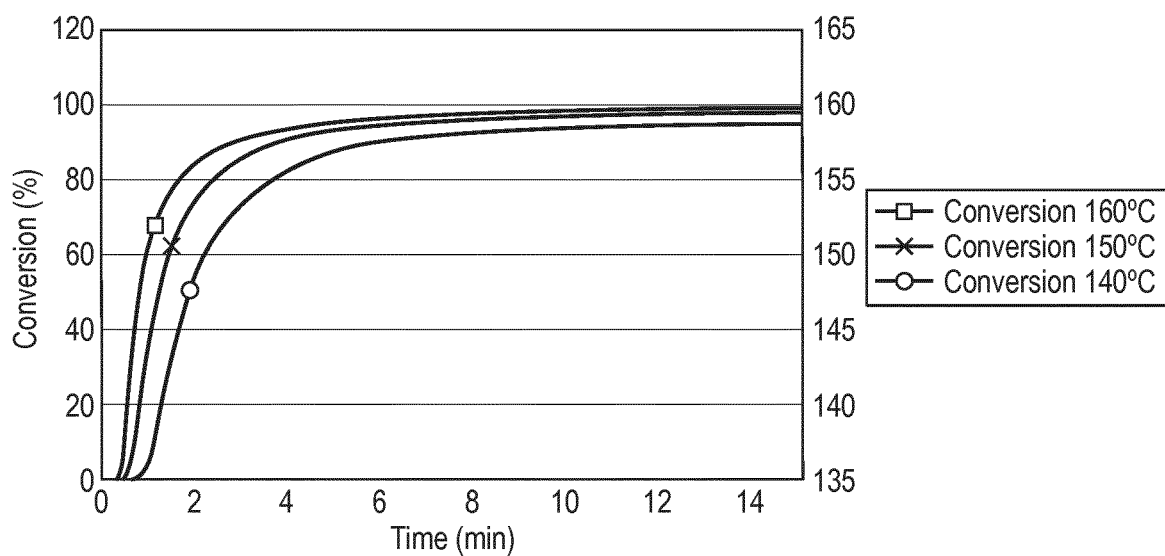
FIG. 3 is a graph showing the relationship between % cure conversion of and time for a number of thermosetting resin systems according to Examples of the present invention.

In these Examples 2, 3 and 4, the relationship between the % conversion of the epoxy resin and time was determined at each of the three different cure temperatures, namely 140, 150 and 160° C. FIG. 3 shows the relationship between the % conversion (left-hand y-axis) and time in minutes (x-axis).

To measure the degree of cure, the heat of polymerisation of the uncured resin was first measured using a TA Instrument Q20 Differential Scanning Calorimeter (DSC) on a fresh sample using a ramp rate of 100° C. per minute to 160° C. then held for 60 minutes to establish a full cure. The 60 minute dwell period was chosen to be well in excess of a full cure period to measure the enthalpy that would be considered to be a 100% cure. This enthalpy would be a value of Y J/g. The degree of conversion at other temperatures and times was then calculated by measuring the heat of polymerisation X J/g by ramping the sample at 100° C. per minute to the target temperature and measuring at the target time. The degree of cure was then calculated using the formula degree of cure=X/Y.

It may be seen from FIG. 3 that the % conversion generally increases with increased cure temperature. With a cure temperature of 150 or 160° C., the epoxy resin achieved substantially full curing, in particular at least 90% conversion, after a curing period within the range of 2 to 4 minutes. With a cure temperature of 150 or 160° C., the epoxy resin achieved at least 95% conversion after respective curing periods of about 6.5 or 4.5 minutes. With a cure temperature of 140° C., the epoxy resin achieved at least 90% conversion and at least 95% conversion after respective curing periods of greater than 5.5 and about 10 minutes.

Comparative Example 1

In contrast to the Examples 1, 2, 3 and 4, Comparative Example 1 is a commercial prepreg incorporating a prepreg resin available in commerce under the trade name HexPly® M77 described in Hexcel Corporation Publication FTU291b (March 2014). The prepreg resin is an epoxy resin matrix having a specified curing temperature of 80° C. to 160° C. and what is claimed as a short cure cycle, the ideal cure cycle being stated to be for a period of 7 minutes at 120° C. and a pressure greater than 5 bar. At a curing temperature of 160° C. the cure cycle period is stated to be 1.5 minutes. However, the Tg is stated to be, after a cure at 130° C. for a period of 15 minutes, 135° C. (measured using DSC 25-250° C., 10° C./minute). That Tg was reached only after a longer (compared to the Examples) cure time of 15 minutes, and implies the maximum Tg which can be achieved by that prepreg resin following curing. Therefore this commercial resin cannot provide a "snap-cure" prepreg with a Tg of at least 150° C. which is higher than the cure temperature.

Also, if the cure temperature was at least 140° C., the Tg would be lower than the cure temperature. If the cured moulded product was removed from a hot mould, in a HO process, the product would be at a temperature above the Tg of the cured resin, and so the product would distort and deform. Accordingly this commercial resin cannot be used to provide a high Tg fibre-reinforced matrix resin composite material product which can be produced in a HI-HO moulding process with minimum cycle times. When used in press moulding, since the curing temperature is higher than the Tg temperature, it would be required to cool the moulded part prior to the demoulding operation in order to avoid distortion.

Comparative Example 2

Figure 4:
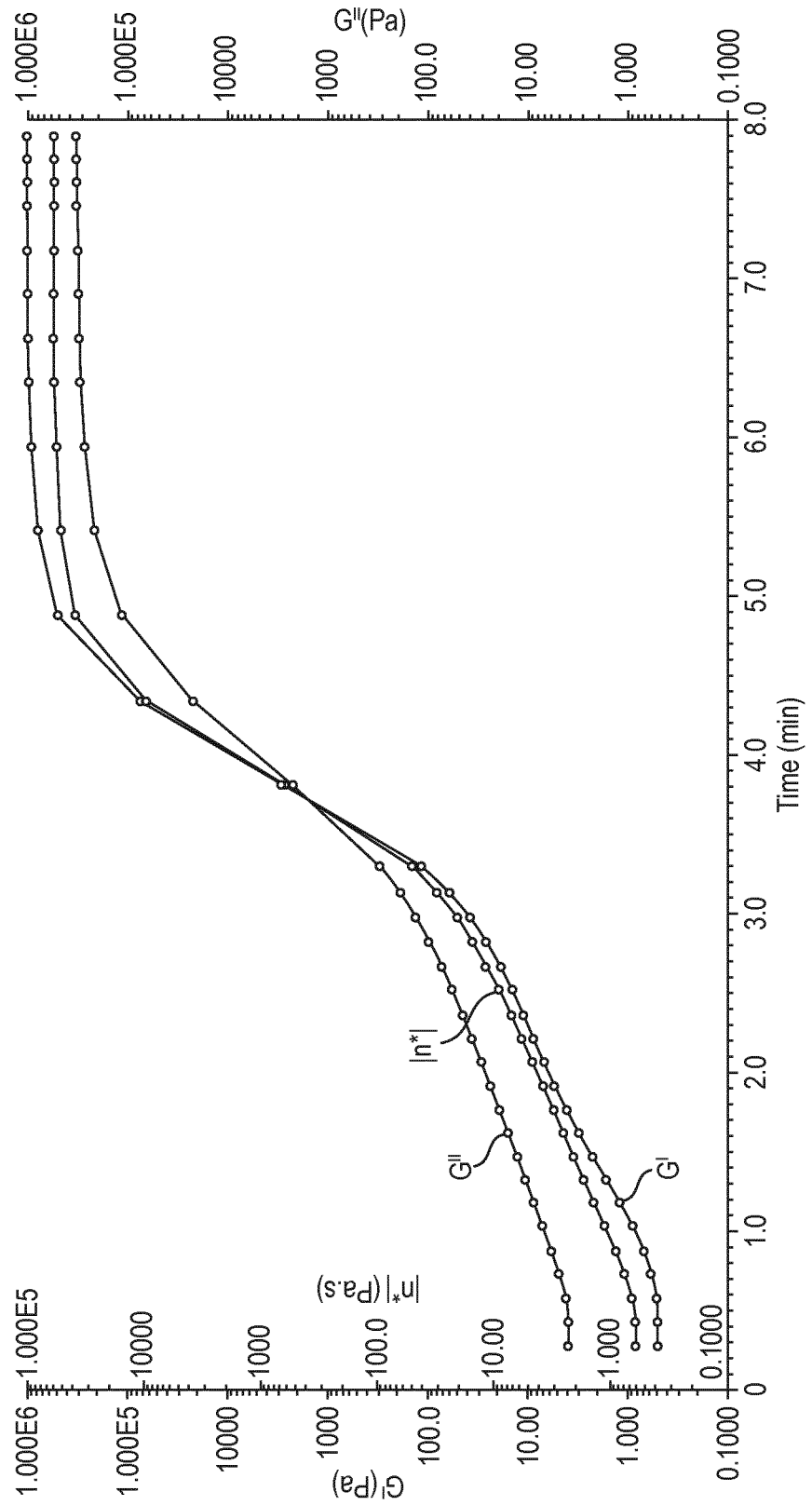
FIG. 4 is a graph showing the relationship between storage modulus, loss modulus and complex viscosity with respect to time, for a thermosetting resin system according to a Comparative Example.

FIG. 4 is a graph showing the relationship between storage modulus, loss modulus and complex viscosity with respect to time, for a conventional epoxy resin system used in prepregs according to Comparative Example 2. The prepreg resin is an epoxy resin having a curing temperature of 160° C.

As compared to FIG. 1, it may be seen that there is a significantly shorter latency period of only about 0.3 minutes before the complex viscosity increases. The cross-over point is at about 3.7 minutes. At the cross-over point the storage modulus and the loss modulus are each about 1300 Pa.

Various modifications to the preferred embodiments of the present invention and to the Examples of the present invention will readily be apparent to those skilled in the art and are encompassed within the scope of the present invention.

The invention claimed is:

1. A method of producing a fibre reinforced resin matrix composite material, the method comprising the steps of:
   (i) providing a laminated stack of prepregs, each prepreg comprising prepreg comprising at least one layer of fibres and a curable thermosetting resin system, the curable thermosetting resin system at least partly impregnating the at least one layer of fibres, wherein the curable thermosetting resin system comprises:
      a. a curable thermosetting resin including at least two epoxide groups;
      b. a curing agent for curing the curable thermosetting resin, wherein the curing agent includes at least one amine group, wherein the curing agent comprises dicyandiamide which is present in the form of particles having a particle size of from 1 to 20 microns and wherein the curing agent is present in an amount of from 2 to 18 wt %, based on the weight of the curable thermosetting resin system; and
      c. an accelerator for accelerating the curing of the thermosetting resin by the curing agent, wherein the accelerator comprises a first accelerator and a second accelerator, wherein the first accelerator includes an azole group, wherein the first accelerator comprises at least one imidazole and the first accelerator is present in an amount of from 0.2 to 3 wt %, based on the weight of the curable thermosetting resin system, and wherein the second accelerator comprises a substituted or unsubstituted urea of formula $R_1R_2$—

N—CO—NR$_3$R$_4$, where R$_1$ is hydrogen or any substituted or unsubstituted aliphatic group, R$_2$ is hydrogen or any substituted or unsubstituted aliphatic, R$_3$ is hydrogen or any substituted or unsubstituted aliphatic or aromatic group, and R$_4$ is hydrogen or any substituted or unsubstituted aliphatic or aromatic group and wherein the second accelerator is present in an amount of from 0.5 to 5 wt %, based on the weight of the curable thermosetting resin system; and (ii) heating up the laminated stack of prepregs in a mould to cause the curable thermosetting resin system to flow and fully impregnate the fibres and to cure to form a cured thermoset resin matrix in a moulded component; wherein the curable thermosetting resin, the curing agent and the accelerator are provided in respective concentrations in the prepreg to provide that, after heating the thermosetting resin at a cure temperature of at least 140° C. for a period of from 1 to 6 minutes, (i) the cured thermosetting resin has a glass transition temperature Tg which is greater than the cure temperature and is within the range of from 150° C. to 180° C. and (ii) the cured thermosetting resin is at least 90% cured.

2. A method according to claim 1 wherein the curable thermosetting resin, the curing agent and the accelerator are provided in respective concentrations in the prepreg to provide that, after curing the thermosetting resin at a cure temperature of at least 150° C. for a period of from 1 to 6 minutes, (i) the cured thermosetting resin has a Tg which is greater than the cure temperature and is within the range of from 160° C. to 180° C. and (ii) the cured thermosetting resin is at least 90% cured.

3. A method according to claim 2 wherein the curable thermosetting resin, the curing agent and the accelerator are provided in respective concentrations in the prepreg to provide that, after curing the thermosetting resin at a cure temperature of at least 150° C. for a period of from 1 to 5 minutes, (i) the cured thermosetting resin has a Tg which is greater than the cure temperature and is within the range of from 170° C. to 180° C. and (ii) the cured thermosetting resin is at least 95% cured.

4. A method according to claim 1 wherein the curable thermosetting resin, the curing agent and the accelerator are provided in respective concentrations in the prepreg to provide that, after heating the curable thermosetting resin system to the cure temperature of at least 140° C., the thermosetting resin is no more than 30% cured after a period of from 0.5 to 1 minute.

5. A method according to claim 1 wherein the curable thermosetting resin has a viscosity of from 4 to 8 Pa·s, at a temperature of 100° C.

6. A method according to claim 1 wherein the second accelerator comprises a substituted urone, selected from monuron, fenuron, diuron or fluometuron, or a mixture of any two or more of any thereof.

7. A method according to claim 1 wherein the curable thermosetting resin system further comprises e. at least one rheology modifier for the curable thermosetting resin system, wherein the rheology modifier comprises at least one thermoplastic resin which includes at least one of a phenoxy resin, an acrylic resin, a polyacrylate resin, a polyacrylonitrile resin, a polyetherimide resin, a polyketone resin and a polysulphone resin, or a mixture of any two or more thereof, wherein the at least one rheology modifier is present in an amount of from 2 to 20 wt %, based on the weight of the curable thermosetting resin system.

8. A method according to claim 7 wherein the thermoplastic resin of the rheology modifier has a softening point within the range of from 170 to 190° C.

9. A method according to claim 1 wherein the curable thermosetting resin is selected from at least one of an epoxy novolac resin, an epoxy cresol novolac resin and an epoxy phenol novolac resin, or a mixture of any two or more thereof.

10. A method according to claim 1 wherein the curable thermosetting resin is present in an amount of from 60 to 95 wt %, based on the weight of the curable thermosetting resin system.

11. A method according to claim 1 wherein the curable thermosetting resin, the curing agent and the accelerator are provided in respective concentrations in the prepreg to provide that, during curing the thermosetting resin at a cure temperature of at least 140° C., the storage modulus G' and the loss modulus G" exhibit a cross-over point within a period of from 2.5 to 5.5 minutes, after the curable thermosetting resin system has attained the cure temperature.

12. A method according to claim 1 wherein the curable thermosetting resin, the curing agent and the accelerator are provided in respective concentrations in the prepreg to provide that, during curing the thermosetting resin at a cure temperature of at least 140° C., the storage modulus G' is a value of less than 100 Pa within a period of from 2 to 3 minutes after the curable thermosetting resin system has attained the cure temperature.

13. A method according to claim 1 wherein the curable thermosetting resin, the curing agent and the accelerator are provided in respective concentrations in the prepreg to provide that, during curing the thermosetting resin at a cure temperature of at least 140° C., the loss modulus G" is a value of $10^5$ Pa within a period of from 4.5 to 6 minutes, after the curable thermosetting resin system has attained the cure temperature.

14. A method according to claim 1 wherein the fibres comprise carbon fibres and the heating step (ii) is carried out in a press mould during a press moulding step and during the heating step (ii) moulding surfaces of the press mould are heated to the cure temperature.

15. A method according to claim 14 wherein prior to step (ii) the laminated stack of prepregs is inserted into the press mould between the moulding surfaces in a loading step and during the loading step the moulding surfaces are at a temperature which is the same as, or no more than 10° C. lower than, the cure temperature.

16. A method according to claim 15 wherein during the loading step the moulding surfaces are at a temperature which is no more than 5° C. lower than the cure temperature.

17. A method according to claim 15 wherein during the loading step the laminated stack of prepregs is at a temperature within a range of from 20 to 35° C.

18. A method according to claim 15 wherein during the loading step the laminated stack of prepregs is in the form of a substantially rigid and self-supporting preform.

19. A method according to claim 15 wherein after step (ii) the moulded component is removed from the press mould in an unloading step and during the unloading step the moulding surfaces are at a temperature which is the same as, or no more than 10° C. lower than, the cure temperature.

20. A method according to claim 19 wherein during the unloading step the moulding surfaces are at a temperature which is no more than 5° C. lower than the cure temperature.

21. A method according to claim 19 wherein during the unloading step the moulded component is substantially rigid and self-supporting.

22. A method according to claim 19 wherein a time period between the loading and unloading steps is from 1 to 6 minutes.

23. A method according to claim 19 wherein a sequence of a plurality of successive moulding cycles is carried out by the press mould, each cycle comprising a respective loading step, heating step in which a respective moulded component is formed from a respective laminated stack of prepregs, and unloading step, and the moulding surfaces are continuously maintained at a temperature which is within 10° C. of a preset temperature corresponding to a predetermined cure temperature of the curable thermosetting resin system.

24. A method according to claim 23 wherein a time period between the unloading and loading steps of successive moulding cycles is less than 2 minutes.

* * * * *